United States Patent [19]

Goto et al.

[11] 4,199,236

[45] Apr. 22, 1980

[54] SYNCHRONIZING SPEED WARNING APPARATUS FOR CAMERA

[75] Inventors: Tetsuro Goto, Funabashi; Hiroshi Hasegawa, Tokyo, both of Japan

[73] Assignee: Nippon Kogaku K.K., Tokyo, Japan

[21] Appl. No.: 922,444

[22] Filed: Jul. 6, 1978

[30] Foreign Application Priority Data

Jul. 22, 1977 [JP] Japan .............................. 52-97094[U]

[51] Int. Cl.² ......................... G03B 7/08; G03B 15/05; G03B 17/18
[52] U.S. Cl. .................................. 354/50; 354/60 L; 354/128; 354/149; 354/289
[58] Field of Search ............... 354/53, 60 L, 127, 128, 354/139, 149, 289, 5 D, 60 E

[56] References Cited

U.S. PATENT DOCUMENTS

| | | | |
|---|---|---|---|
| 3,688,664 | 9/1972 | Mashimo | 354/60 LX |
| 3,971,050 | 7/1976 | Okuno et al. | 354/128 |

FOREIGN PATENT DOCUMENTS 97647 8/1974 Japan .

Primary Examiner—Michael L. Gellner
Attorney, Agent, or Firm—Shapiro and Shapiro

[57] ABSTRACT

A photographic camera for use in conjunction with a flash device is provided with a warning apparatus which provides a warning signal when a selected shutter speed is beyond a shutter speed range synchronizable with the light emission from the flash device. The warning apparatus comprises a circuit for providing a signal indicating that the selected shutter speed is faster than a limit shutter speed, beyond which the shutter cannot be synchronized with the flash. A charge detection circuit detects the completion of charging of the flash device. A warning indication that the selected shutter speed is faster than the limit shutter speed is provided only upon completion of charging of the flash device, thereby conserving battery power.

5 Claims, 1 Drawing Figure

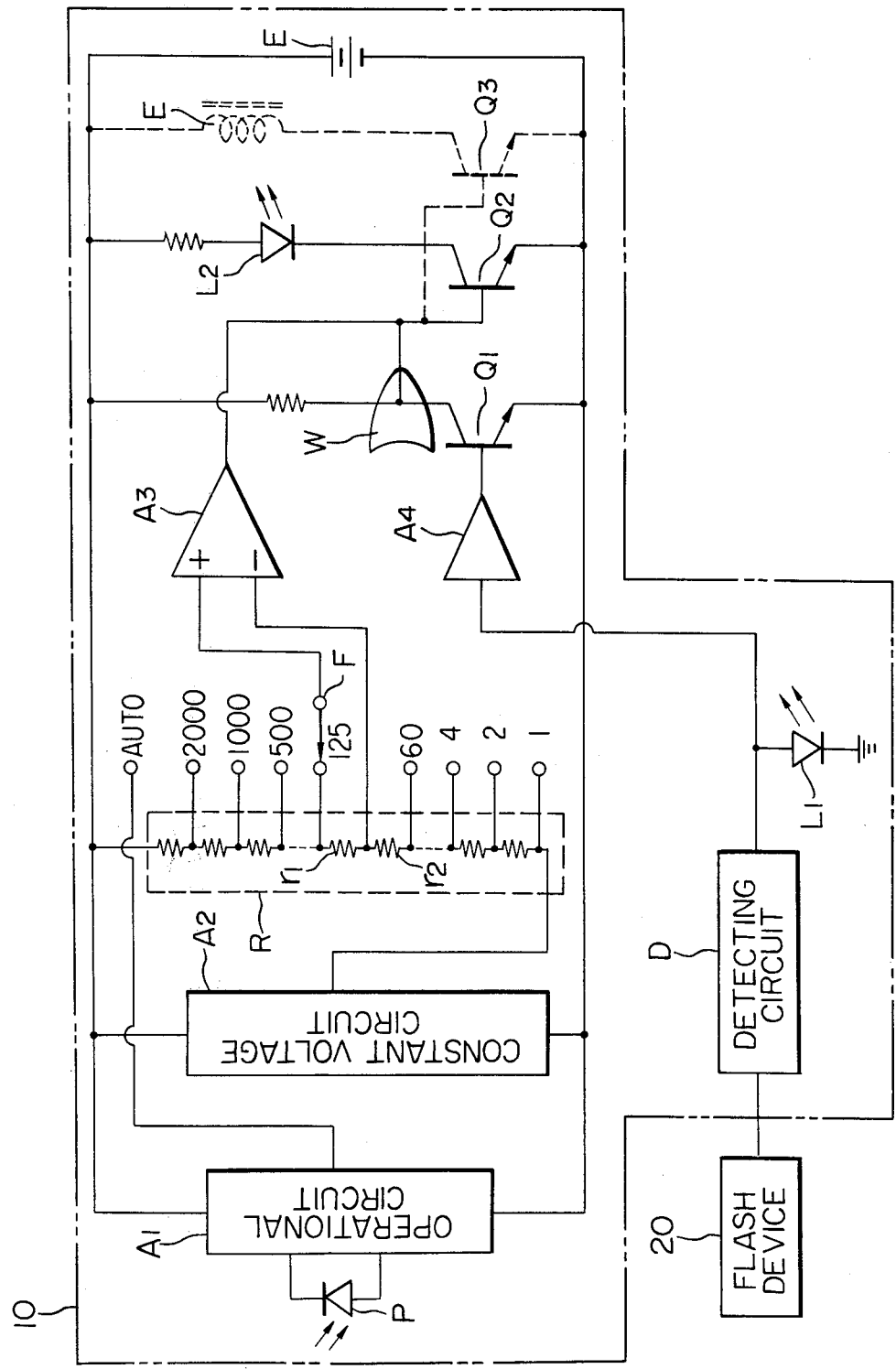

SYNCHRONIZING SPEED WARNING APPARATUS FOR CAMERA

BACKGROUND OF THE INVENTION

1. Field of the Invention

The present invention relates to a synchronizing speed warning apparatus for use in a photographic camera capable of detecting and indicating that a selected shutter speed does not synchronize with a flash device such as an electronic strobe flash.

2. Description of the Prior Art

In the prior art there is already known a similar warning apparatus comprising a switch to be closed cooperative with the operation of mounting a flash device onto a camera and another switch to be closed cooperative with the operation of selecting a shutter speed faster than that synchronizable with the light emitted by said flash device, and adapted to light a warning lamp in the viewing field of a finder of said camera only upon closure of both of said switches to indicate that the selected shutter speed does not synchronize with the light emitted by said flash device.

Such prior apparatus, however, results in an unnecessary waste of electrical energy since the lamp is lighted as long as the aforementioned two switches are closed even before the flash device is charged to an extent sufficient for emitting an appropriate quantity of light to photograph with the flash.

SUMMARY OF THE INVENTION

The object of the present invention, therefore, is to provide a synchronizing speed warning apparatus for a camera free from the above-mentioned drawback and thus preventing unnecessary waste of electrical energy.

The present invention will now be explained in detail with respect to an embodiment thereof shown in the attached drawing.

BRIEF EXPLANATION OF THE DRAWINGS

The attached drawing shows a block diagram of an embodiment of the synchronizing speed warning apparatus of the present invention.

DESCRIPTION OF THE PREFERRED EMBODIMENTS

Referring to the attached drawing there is shown a light-receiving element P such as a photodiode which receives the light from the object to be photographed and transmits an information on the quantity of light to an operational circuit A1. Said operational circuit A1 calculates a shutter speed providing an appropriate exposure with respect to the preselected diaphragm opening and the preselected sensitivity of photographic film in response to the quantity of light received by said light-receiving element P, and provides a variable output voltage, corresponding to the calculated shutter speed, to an output terminal AUTO. As already known in the art, said output voltage is fixed responsive to the operation of a shutter button (not shown) of the camera 10 and is maintained at a value obtained immediately before the shutter release.

There is provided a constant voltage (or alternatively a constant current) circuit A2 from which an output voltage is applied to a voltage-dividing circuit R consisting of serially connected resistors of substantially the same resistance. Between said resistors there are provided output terminals 2000, 1000, . . . , 4, 2 and 1 which respectively generate voltages necessary for obtaining shutter speeds of 1/2000 sec., 1/1000 sec., . . . , ¼ sec., ½ sec. and 1 sec. A movable wiper terminal F, linked with a shutter speed dial (not shown) can be selectively connected to either one of the above-mentioned output terminals 2000 - 1 for manual shutter-speed setting or the above-mentioned output terminal AUTO, thus transmitting the output voltage of the selected output terminal to the (+) input terminal of a comparator A3. The (−) input terminal thereof receives a standard voltage which is obtained in this case from the junction between the voltage-dividing resistors r1 and r2 connected between the output terminal 125 and 60, since in the present embodiment the limit shutter speed synchronizable with the strobe flash light is supposed to be located between 1/60 and 1/25 sec. In the present embodiment said comparator A3 is composed of an operational amplifier which generates a high-level or low-level output respectively when the input voltage v+ applied to the (+) input terminal (non-inverting input) is larger or smaller than the input voltage v− applied to the (−) input terminal (inverting input), i.e. respectively when $v+ > v-$ or $v+ < v-$.

A detecting circuit D is provided to detect the completion of charging of a flash device 20 such as a strobe light. Upon completion of the charging thereof a light-emitting element L1 connected to said detecting circuit is lighted or turned on, and thus at the anode of said light-emitting element, a low-level signal is generated, which in turn is supplied to an input terminal of an amplifier A4. The above-mentioned detecting circuit D and the light-emitting element L1 may be provided on the camera body or in the strobe light.

The output of said amplifier A4 is connected to the base of a transistor Q1 which is rendered conductive or non-conductive respectively when the output of said amplifier A4 is at high or low level. The collector of said transistor Q1 is connected to a wired OR circuit W, while the output of aforementioned comparator A3 is also connected to said wired OR circuit W, as illustrated. Thus the voltage applied to the base of transistor Q2 is controlled by the outputs of said comparator A3 and transistor Q1. More specifically the base potential of transistor Q2 reaches a high level to render said transistor Q2 conductive thereby lighting a light-emitting element L2 when the output of comparator A3 is at a high level and the output of amplifier A4 is at a low level, rendering the transistor Q1 non-conductive. Stated differently the light-emitting element L2 becomes lighted only when the completion of charging of flash device 20 is detected and simultaneously the shutter speed is set at a value beyond a limit shutter speed synchronizable with the light emission of said flash device.

The above-mentioned function will be further described hereinafter. In case the movable terminal F is connected to the output terminal 60 to select a shutter speed of 1/60 sec., the comparator, receiving an input voltage at the (+) terminal lower than that received at the (−) terminal, generates a low-level output signal. On the other hand, prior to the completion of charging of flash device 20, the amplifier A4 generates a high-level signal to render the transistor Q1 conductive, while the transistor Q2 is rendered non-conductive, as the collector of transistor Q1 is connected through the wired OR circuit W to the output of comparator A3 which has generated a low-level signal in this state.

Consequently the light-emitting element L2 is not turned on in this state. Then upon completion of the charging of flash device, the amplifier A4 generates a low-level output signal to turn off the transistor Q1, so that the light-emitting element L2 still remain turned off.

Then, in case the movable terminal F is connected to the output terminal 125 to select a shutter speed of 1/125 sec., the comparator A3, receiving an output voltage at the (+) input terminal larger than that at the (−) terminal, reproduces a high-level signal. On the other hand, prior to the completion of charging flash device 20, the amplifier A4 produces a high-level output to render the transistor Q1 conductive, so that the transistor Q2 is rendered non-conductive since the wired OR circuit W produces a low-level signal. Upon completion of the charging of flash device, the amplifier A4 produces a low-level signal to turn off the transistor Q1, so that both of the comparator A3 and transistor Q1 generate high-level signals to turn on the transistor Q2. Thus the light-emitting element L2 is lighted to indicate that the selected shutter speed is not synchronizable with the light emission of flash device.

As will be apparent from the foregoing explanation, the function described in case of a shutter speed of 1/60 sec. is also applicable to other synchronizable shutter speeds ( ... ¼, ½ and 1 sec.), while the function described in case of a shutter speed of 1/125 sec. is also applicable to other non-synchronizable shutter speeds (1/2000, 1/1000, 1/500 sec., ... ).

Also in case the movable terminal F is connected to the output terminal AUTO, there is generated at the terminal AUTO an output voltage corresponding to the shutter speed associated with the brightness of the object to be photographed, the sensitivity of photographic film and the aperture of diaphragm, said output voltage being in amplitude equal to the standard voltage when the selected shutter speed is equal to the aforementioned limit synchronizable shutter speed and being larger or smaller than said standard voltage respectively when the selected shutter speed is longer or shorter than said limit synchronizable shutter speed. The output voltage is compared with the standard voltage in the comparator A3 which thus produces a high-level or low-level signal when the automatically selected shutter speed is non-synchronizable or synchronizable, respectively. The function thereafter is performed in the same manner as described, lighting the light-emitting element L2 only when the automatically selected shutter speed is not synchronizable with the light emission from the flash device thereby warning the user of the non-synchronizable state.

Furthermore, it is possible to provide an energizing circuit consisting of a transistor Q3 and a magnet M as illustrated by broken line, said transistor Q3 being turned on to energize the magnet M simultaneously with the lighting of said light-emitting element L2 thereby locking a shutter release mechanism (not shown). Such locking function can be achieved for example by a lever which is provided with an armature to be attracted by said magnet M to prohibit displacement of the shutter release button upon attraction.

In contrast to the conventional similar apparatus which has been unable to identify whether the automatically selected shutter speed, obtained in response to the quantity of light from the object to be photographed when the shutter speed selecting dial is placed at the AUTO position, is synchronizable with the light emission from the flash device, the apparatus of the present invention is capable of indicating a warning whenever a selected shutter speed is not synchronizable with the light emission from the flash device even when said shutter speed is automatically determined, by means of comparing the output voltage of the AUTO terminal with the standard voltage. Consequently the apparatus can identify if the shutter speed is synchronizable with the light emission from the flash device even in case of using the flash device to photograph in daylight with the shutter in the AUTO condition.

What we claim is:

1. A warning apparatus for use in a photographic camera for providing a warning that a selected shutter speed is faster than a limit shutter speed beyond which the shutter is not synchronizable with the light emission from a flash device, comprising:
   means for generating a standard voltage corresponding to the limit shutter speed;
   means for generating an output voltage corresponding to the selected shutter speed;
   comparator means for comparing said standard voltage and said output voltage and for generating a signal representative of the result of said comparison;
   a charge completion detection circuit adapted for connection to the flash device for generating a charge completion signal upon completion of charging of the flash device; and
   control means connected to said comparator means and said detection circuit and adapted for controlling a warning indicator to provide a warning indication upon receipt of both said charge completion signal and a signal from said comparator means indicating that the selected shutter speed is faster than the limit shutter speed.

2. A warning apparatus according to claim 1, wherein said means for generating an output voltage is adapted to generate an output voltage equal to said standard voltage when said selected shutter speed is equal to said limit shutter speed.

3. A warning apparatus according to claim 1, which further comprises:
   means for measuring the quantity of light received from an object to be photographed; and
   means for automatically selecting the shutter speed required for obtaining the proper exposure corresponding to the quantity of light measured.

4. A warning apparatus according to claim 1, wherein said means for generating an output voltage comprises:
   a voltage dividing circuit having a plurality of series connected resistors;
   a first output terminal connected to said voltage dividing circuit in such a manner as to provide an output voltage higher than said standard voltage;
   a second output terminal connected to said voltage dividing circuit in such a manner as to provide an output voltage lower than said standard voltage; and
   means for selectively deriving said output voltage from either one of said output terminals.

5. A warning apparatus according to claim 1, which further comprises:
   means connected to said control means for inhibiting the operation of a shutter release mechanism of the camera upon the receipt by said control means of both said charge completion signal and said signal from said comparator means indicating that the selected shutter speed is faster than the limit shutter speed.

* * * * *